United States Patent
Garceau et al.

(10) Patent No.: US 7,603,208 B2
(45) Date of Patent: Oct. 13, 2009

(54) GEOSPATIAL IMAGE CHANGE DETECTING SYSTEM WITH ENVIRONMENTAL ENHANCEMENT AND ASSOCIATED METHODS

(75) Inventors: Robert M. Garceau, Rockledge, FL (US); Mark Rahmes, Melbourne, FL (US); Guillermo E. Gutierrez, Melbourne, FL (US); Todd Ham, Alexandria, VA (US); Joseph Nemethy, West Melbourne, FL (US); Jay Hackett, Melbourne, FL (US)

(73) Assignee: Harris Corporation, Melbourne, FL (US)

( * ) Notice: Subject to any disclaimer, the term of this patent is extended or adjusted under 35 U.S.C. 154(b) by 599 days.

(21) Appl. No.: 11/328,677

(22) Filed: Jan. 10, 2006

(65) Prior Publication Data

US 2007/0162194 A1    Jul. 12, 2007

(51) Int. Cl.
*G05D 1/00* (2006.01)
*G06K 9/00* (2006.01)
*G06K 9/32* (2006.01)

(52) U.S. Cl. ............................ 701/3; 382/103; 382/294; 382/100; 382/154; 382/113; 345/606; 345/587

(58) Field of Classification Search ..................... 701/3; 382/294, 103, 100, 154; 345/606, 587
See application file for complete search history.

(56) References Cited

U.S. PATENT DOCUMENTS

| | | | |
|---|---|---|---|
| 5,719,949 A * | 2/1998 | Koeln et al. | 382/113 |
| 5,974,170 A * | 10/1999 | Louis et al. | 382/154 |
| 5,974,423 A * | 10/1999 | Margolin | 345/606 |
| 6,118,885 A * | 9/2000 | Wadsworth et al. | 382/100 |
| 6,243,483 B1 | 6/2001 | Petrou et al. | 382/103 |
| 6,654,690 B2 * | 11/2003 | Rahmes et al. | 702/5 |
| 6,744,442 B1 * | 6/2004 | Chan et al. | 345/587 |
| 6,904,159 B2 * | 6/2005 | Porikli | 382/103 |
| 7,142,984 B2 * | 11/2006 | Rahmes et al. | 702/5 |
| 2003/0059743 A1 * | 3/2003 | Lechner | 434/43 |
| 2004/0117358 A1 | 6/2004 | von Kaenel et al. | 707/3 |
| 2004/0249654 A1 | 12/2004 | Sohl, III et al. | 705/1 |
| 2005/0220363 A1 * | 10/2005 | Oldroyd | 382/294 |

(Continued)

OTHER PUBLICATIONS

"GIS to DSM Fusion and Basic Change Detection", Timothée Bailloeul, Dec. 11, 2003, 40 pages, available at kepler.ia.ac.cn/seminar/gis_fusion_1.pdf.

(Continued)

*Primary Examiner*—Khoi Tran
*Assistant Examiner*—Ian Jen
(74) *Attorney, Agent, or Firm*—Allen, Dyer, Doppelt, Milbrath & Gilchrist, P.A.

(57) ABSTRACT

An image change detecting system may include an image processor cooperating with the database for generating a reference geospatial image corresponding to the collected geospatial image, an image enhancer for enhancing at least one of the reference geospatial image and the collected geospatial image based upon at least one environmental condition, and a change detector cooperating with the image processor and the image enhancer. The change detector may detect a change between the collected geospatial image and the reference geospatial image with at least one thereof enhanced by the image enhancer based upon the at least one environmental condition. The environmental condition may include a weather condition, a time of day, or a time of year. The environmental condition may be typically associated with the collected geospatial image.

22 Claims, 9 Drawing Sheets

U.S. PATENT DOCUMENTS

| | | | |
|---|---|---|---|
| 2005/0257241 A1 | 11/2005 | Faulkner et al. | 725/92 |
| 2007/0162193 A1* | 7/2007 | Garceau et al. | 701/3 |
| 2007/0162194 A1* | 7/2007 | Garceau et al. | 701/3 |
| 2007/0162195 A1* | 7/2007 | Garceau et al. | 701/3 |

OTHER PUBLICATIONS

"Geospatial Imagery Center of Excellence", Harris Corporation, 1998-2004, 3 pages, available at www.govcomm.harris.com/about/capabilities/geospatial.html.

"SAR Simulation Based Change Detection with High-Resolution SAR Images in Urban Environments", Timo Balz, Institute for Photogrammetry (ifp), University of Stuttgart, Germany Geschwister-Scholl-Strasse 24D, D-70174 Stuttgart, Commission VII, WG4, 2004, 6 pages, available at www.isprs.org/istanbul2004/comm7/papers/92.pdf.

"Automatic Change Detection of Geospatial Databases Based on a Decision-Level Fusion Technique", Samadzadegan et al, University of Tehran, Tehran, Iran, Stuttgart University of Applied Sciences, Stuttgart, Germany, 3 pages, 2004, available at www.isprs.org/istanbul2004/comm2/papers/178.pdf.

"Automated GIS Data Collection and Update", Volker Walter, Stuttgart, pp. 267-280, available at citeseer.ist.psu.edu/walter99automated.html.

"Real-Time Global Data Model for the Digital Earth", Faust et al., GIS Cenetr, GVU Center, Georgia Institute of Technology, 9 pages,avaible at www.ncgia.ucsb.edu/globalgrids/abstracts/Faust.htm.

"Integrating Spatial Information and Image Analysis—One Plus One Makes Ten", Baltsavias et al., 12 pages, IAPRS, vol. XXXIII, Amsterdam 2000, available at citeseer.ist.psu.edu/baltsavias00integrating.html.

Simard et al.; "Database Verification Using an Imaging Senor"; vol. 4713, 2002; pp. 42-49; XP002424960.

Stossel et al.; *"Mosaic: A Model-Based Change Detection Process"*; vol. 2, 2002; Sunnyvale, CA; pp. 1113-1119; XP002424959.

Bailloeul et al.; *"Urban Digital Map Updating from Satellite High Resolution Images Using GIS Data as a Priori Knowledge"*; May 22-23, 2003; Piscataway, NJ; pp. 283-287; XP010650217.

Samadzadegan et al.; *"Automatic Change Detection of Urban Geospatial Databases Based on High Resolution Satellite Images Using AI Concepts"*; Sep. 8, 2003; XP002424961.

* cited by examiner

GEOSPATIAL IMAGE CHANGE DETECTING SYSTEM WITH ENVIRONMENTAL ENHANCEMENT AND ASSOCIATED METHODS

FIELD OF THE INVENTION

The present invention relates to the field of image processing, and, more particularly, to geospatial image processing and related methods.

BACKGROUND OF THE INVENTION

As discussed in the background of U.S. Pat. No. 6,654,690 to Rahmes et al. and assigned to the assignee of the present invention, topographical models of geographical areas may be used for many applications. For example, topographical models may be used in flight simulators and for planning military missions. Furthermore, topographical models of man-made structures (e.g., cities) may be extremely helpful in applications such as cellular antenna placement, urban planning, disaster preparedness and analysis, and mapping, for example.

Various types and methods for making topographical models are presently being used. One common topographical model is the digital elevation map (DEM). A DEM is a sampled matrix representation of a geographical area that may be generated in an automated fashion by a computer. In a DEM, co-ordinate points are made to correspond with a height value. DEMs are typically used for modeling terrain where the transitions between different elevations (e.g., valleys, mountains, etc.) are generally smooth from one to a next. That is, DEMs typically model terrain as a plurality of curved surfaces and any discontinuities therebetween are thus "smoothed" over. For this reason, DEMs generally are not well suited for modeling man-made structures, such as skyscrapers in a downtown area, with sufficient accuracy for many of the above applications.

Another approach to producing topographical models has been developed by the Harris Corporation, assignee of the present invention, and is commercially referred to as RealSite®. RealSite® provides a semi-automated process for making three-dimensional (3D) topographical models of geographical areas, including cities, that have accurate textures and structure boundaries. Moreover, RealSite® models are geospatially accurate. That is, the location of any given point within the model corresponds to an actual location in the geographical area with very high accuracy (e.g., within a few meters). The data used to generate RealSite® models may include aerial and satellite photography, electro-optical, infrared, and light detection and ranging (LIDAR).

RealSite® models not only provide enhanced accuracy over prior automated methods (such as automated DEM generation), but since they are produced using a semi-automated computer process they may be created much more rapidly than comparable manually rendered models. Yet, even though the RealSite® model generation process begins with actual data of a geographic location, some user delineation may be required to distinguish objects within an input data set before automated computer algorithms can render the final models. Thus, producing RealSite® models for large geometric areas of several kilometers, for example, may require a significant amount of time and labor.

Accordingly, U.S. Pat. No. 6,654,690 discloses a significant advance of an automated method for making a topographical model of an area including terrain and buildings thereon based upon randomly spaced data of elevation versus position. The method may include processing the randomly spaced data to generate gridded data conforming to a predetermined position grid, processing the gridded data to distinguish building data from terrain data, and performing polygon extraction to make the topographical model of the area including terrain and buildings thereon.

Change detection is an important part of many commercial Geographic Information Systems (GIS)-related applications. Moreover, given the recent explosion of available imagery data and the increasing number of areas-of-interest throughout the world, the trend is towards rapid, automated change detection algorithms. To make effective use of these imagery databases care should generally be taken that the newly collected imagery match the existing/reference imagery's characteristics such as coverage, field-of-view, color, and most notably, sensor location and viewpoint.

Unfortunately, this presents a difficulty since in many cases it is time-consuming, very difficult or even impossible to replicate the original collection scenario due to: sensor-scheduling (in the case of space-based), cost of re-flying the sensor (in the case of aerial-based), or that the sensor is no longer in use (both cases). Thus large amounts of collected imagery may go underutilized in regards to change detection.

The current state of the art in change detection involves either: (1) geo-registering two images (reference and new collect images) together so that the automated change detection algorithms will have a high rate of success, or (2) performing sophisticated pixel-correlation change detection algorithms that tend to be slow, iterative in nature, and manually intensive, since the algorithms often need to be tweaked between runs. The first case requires a high degree of correlation in the location and parameters of the sensor, or sensors, if they are different between the two collects. The second case does not require as high a degree of correlation although some is still needed, but it is neither automated nor fast. Neither approach is satisfactory.

An article by Walter entitled "Automated GIS Data Collection and Update," pp. 267-280, 1999, examines data from different sensors regarding their potential for automatic change detection. Along these lines an article entitled "Automatic Change Detection of Urban Geospatial Databases Based on High Resolution Satellite Images Using AI Concepts" to Samadzadegan et al. discloses an automatic change detection approach for changes in topographic urban geospatial databases taking advantage of fusion of description and logical information represented on two levels. U.S. Pat. No. 6,904,159 discloses identifying moving objects in a video using volume growing and change detection masks. U.S. Pat. No. 6,243,483 discloses a mapping system for the integration and graphical display of pipeline information that enables automated pipeline surveillance.

Accordingly, although a growing body of geospatial scene model data exists, it has not yet been exploited in the area of automated change detection of sensor images.

SUMMARY OF THE INVENTION

In view of the foregoing background, it is therefore an object of the present invention to provide a an image change detecting system to detect a change in a collected geospatial image from a geospatial image sensor carried by an airborne platform having enhanced accuracy and that operates efficiently.

This and other objects, features and advantages in accordance with the invention are provided by an image change detecting system comprising an image processor cooperating with the database for generating a reference geospatial image corresponding to the collected geospatial image, an image enhancer for enhancing at least one of the reference geospatial image and the collected geospatial image based upon at least one environmental condition, and a change detector cooperating with the image processor and the image enhancer. The change detector may detect a change between the collected geospatial image and the reference geospatial image with at least one thereof enhanced by the image enhancer based upon the at least one environmental condition. Accordingly, the change detection accuracy is enhanced.

The at least one environmental condition may comprise at least one weather condition, such as relating to image obscuration and surface reflectivity. The at least one environmental condition may comprise at least one of a time of day and a time of year that may effect the intensity of the image, shadow lengths, etc. The at least one environmental condition may be typically associated with the collected geospatial image in some embodiments so that the reference image is enhanced to match the environmental conditions associated with the collected geospatial image. Of course, in other embodiments, the collected geospatial image could be enhanced to match at least one environmental condition associated with the reference geospatial image.

The database may comprise a geospatial scene model database, for example. In addition, the geospatial scene model database may comprise three-dimensional (3D) scene model data, and the collected geospatial image and the reference geospatial image may each comprise respective two-dimensional (2D) image data.

The geospatial scene model database may comprise at least one of terrain data, building data, and foliage data. Moreover, the collected geospatial image may have at least one geospatial collection value associated therewith. Accordingly, the image processor may generate the reference geospatial image based upon synthetically positioning a virtual geospatial image sensor within a geospatial scene model based upon the at least one geospatial collection value. For example, the at least one geospatial collection value may comprise at least one of a geospatial collection position, a geospatial collection orientation, and a geospatial collection field-of-view.

A method aspect of the invention is directed to an image change detecting method to detect a change in a collected geospatial image from a geospatial image sensor carried by an airborne platform. The image change detecting method may comprise using an image processor cooperating with a database for generating a reference geospatial image corresponding to the collected geospatial image; enhancing at least one of the reference geospatial image and the collected geospatial image based upon at least one environmental condition; and detecting a change between the collected geospatial image and the reference geospatial image with at least one thereof enhanced based upon the at least one environmental condition.

DETAILED DESCRIPTION OF THE PREFERRED EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout, and prime notation is used to indicate similar elements in alternative embodiments.

Figure 1:
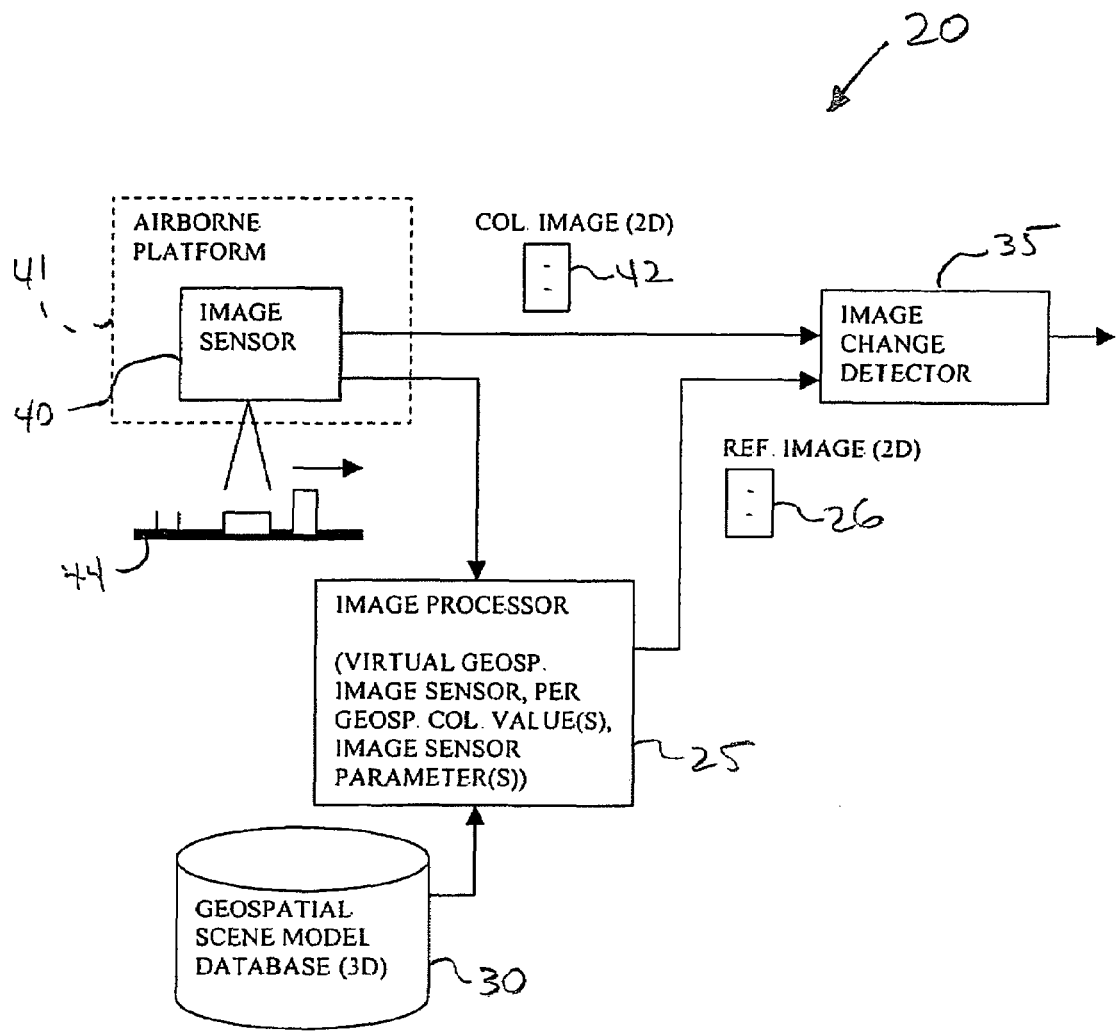
FIG. 1 is a schematic block diagram of an image change detecting system in accordance with the invention.

Referring initially to FIG. 1, an image change detecting system 20 is initially described. As shown in the illustrated embodiment, the image change detecting system 20 comprises an image processor 25 cooperating with a geospatial scene model database 30 for generating a reference geospatial image 26 corresponding to the collected geospatial image 42. The system 20 also includes a change detector 35 cooperating with the image processor 25 for detecting a change between the collected geospatial image 42 and the reference geospatial image 26. The collected geospatial image 42 is generated by an image sensor carried by the schematically illustrated airborne platform 41. As will be appreciated by those skilled in the art, the airborne platform 41 may be an airplane, helicopter, unmanned aerial device, lighter-than-air aircraft, satellite etc. Representative examples of collected and reference geospatial images 42, 26 are described in greater detail below.

The geospatial scene model database 30 may comprise three-dimensional (3D) scene model data, and the collected geospatial image and the reference geospatial image may each comprise respective two-dimensional (2D) image data. The geospatial scene model database 30 may be especially advantageous for providing accurate change detection in an efficient manner.

The collected geospatial image 42 may have at least one geospatial collection value associated therewith. Accordingly, the image processor 25 may generate the reference geospatial image 26 based upon synthetically positioning a virtual geospatial image sensor within a geospatial scene model extracted from the geospatial scene model database 30 based upon the at least one geospatial collection value. This type of model extraction and synthetic sensor positioning will be readily understood by those skilled in the art and needs no further discussion herein. For example, the at least one geospatial collection value may include at least one of a geospatial collection position, a geospatial collection orientation, and a geospatial collection field-of-view.

These geospatial collection values may be provided from the image sensor 40 and/or the airborne platform 41 as will also be appreciated by those skilled in the art. The particular collected geospatial image 42 will have such values associated therewith. Of course, as the airborne platform moves over its flight path above the ground 44, a plurality of such collected geospatial images 42 may be generated. For clarity of explanation, the description provided herein is directed to a single collected geospatial image 42 and those skilled in the art will readily appreciate its application to multiple collected geospatial images. The airborne platform 41 will typically include a GPS and/or inertial navigation equipment, not shown, that can provide the position and orientation information associated with the collected geospatial image 42.

Alternatively or in addition to the geospatial collection value, the collected geospatial image may have at least one image sensor parameter associated therewith. Accordingly, the image processor may generate the reference geospatial image based upon synthetically positioning a virtual geospatial image sensor having the at least one image sensor parameter within a geospatial scene model. For example, the at least one image sensor parameter may include at least one of a sensor wavelength range, a sensor polarization, and a sensor pixel characteristic.

The sensor wavelength range may be in the visible, infrared, ultraviolet range, or RF ranges such as for synthetic aperture radar (SAR) image sensing, for example. The polarity may be selected to be horizontal or vertical or some combination thereof, such as to control reflections from certain types of surfaces. The sensor pixel characteristic may be a color assigned to a pixel value, for example, or may be a pixel size or aspect ratio. Those of skill in the art will appreciate yet further image sensor parameters that may be inherent or attributed to the collected geospatial image 42. One or more of such image sensor parameters may be taken into account by the image processor 25, such as by modifying the data extracted from the geospatial scene model database 30 to produce the reference geospatial image 26 that may more closely match the collected geospatial image 42. Accordingly, the accuracy and efficiency of the image change detector 35 may be increased.

The geospatial scene model database 30 may comprise a light detection and ranging (LIDAR) geospatial scene model database, although other similar databases may also be used. Suitable models may include RealSite models, LiteSite (LIDAR and IFSAR) models, high-resolution digital elevation models (DEMS), etc. The geospatial scene model database 30 may comprise, for example, at least one of terrain data, building data, and foliage data as will be appreciated by those skilled in the art. As will be readily appreciated by those skilled in the art, the available pool of accurate, georeferenced 3D scene models is rapidly increasing.

Figure 2:
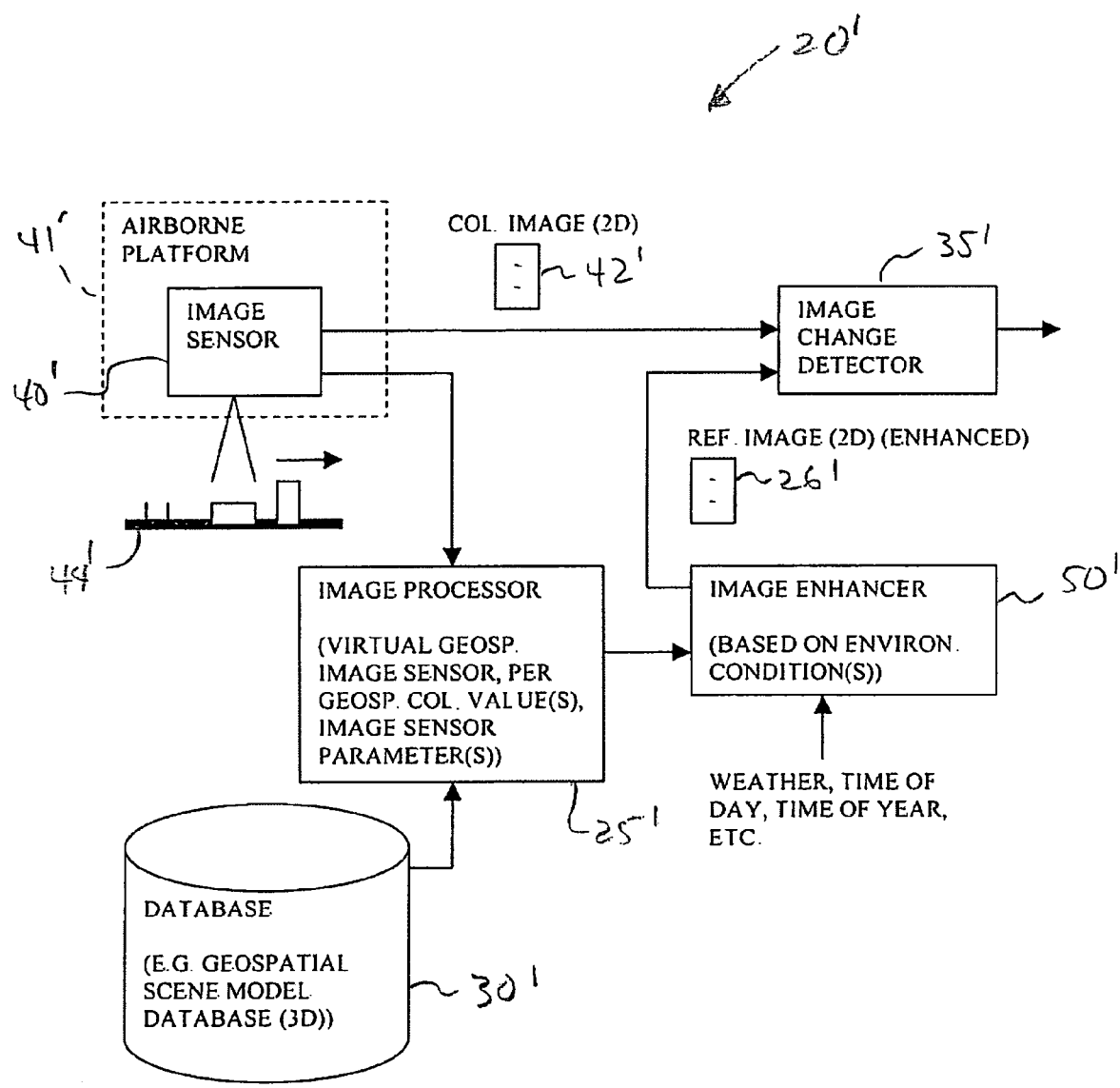
FIG. 2 is a more detailed schematic block diagram of the image change detecting system as shown FIG. 1.

Referring now additionally to FIG. 2, the change detecting system 20' illustratively includes the image processor 25' cooperating with the database 30' for generating a reference geospatial image 26' corresponding to the collected geospatial image 42', an image enhancer 50' for enhancing the reference geospatial image 26' that is supplied to the change detector 35'. As will be appreciated by those skilled in the art, the change detector 35' may now detect a change between the collected geospatial image 42' and the reference geospatial image 26' with the reference geospatial image enhanced by the image enhancer 50' based upon the at least one environmental condition. Accordingly, the change detection accuracy is enhanced.

In the change detection system 20', the image enhancer 50' illustratively acts upon the geospatial reference image, however, in other embodiments, the image enhancer may operate on just the collected geospatial image 42' or both of these images as will be appreciated by those skilled in the art. In other words, one or both of the collected geospatial image and the reference geospatial image may be enhanced to facilitate accurate change detection based upon at least one environmental condition.

The at least one environmental condition may comprise at least one weather condition, such as relating to image obscuration and surface reflectivity, for example. The at least one environmental condition may comprise at least one of a time of day and a time of year that may effect the intensity of the image, shadow lengths, etc.

The image change detection system 20' may use a database 30', such as the geospatial scene model database described above with its attendant features and advantages. In other embodiments, the database 30' may be provided by an image and/or video database, for example, as will be appreciated by those skilled in the art.

Figure 3:
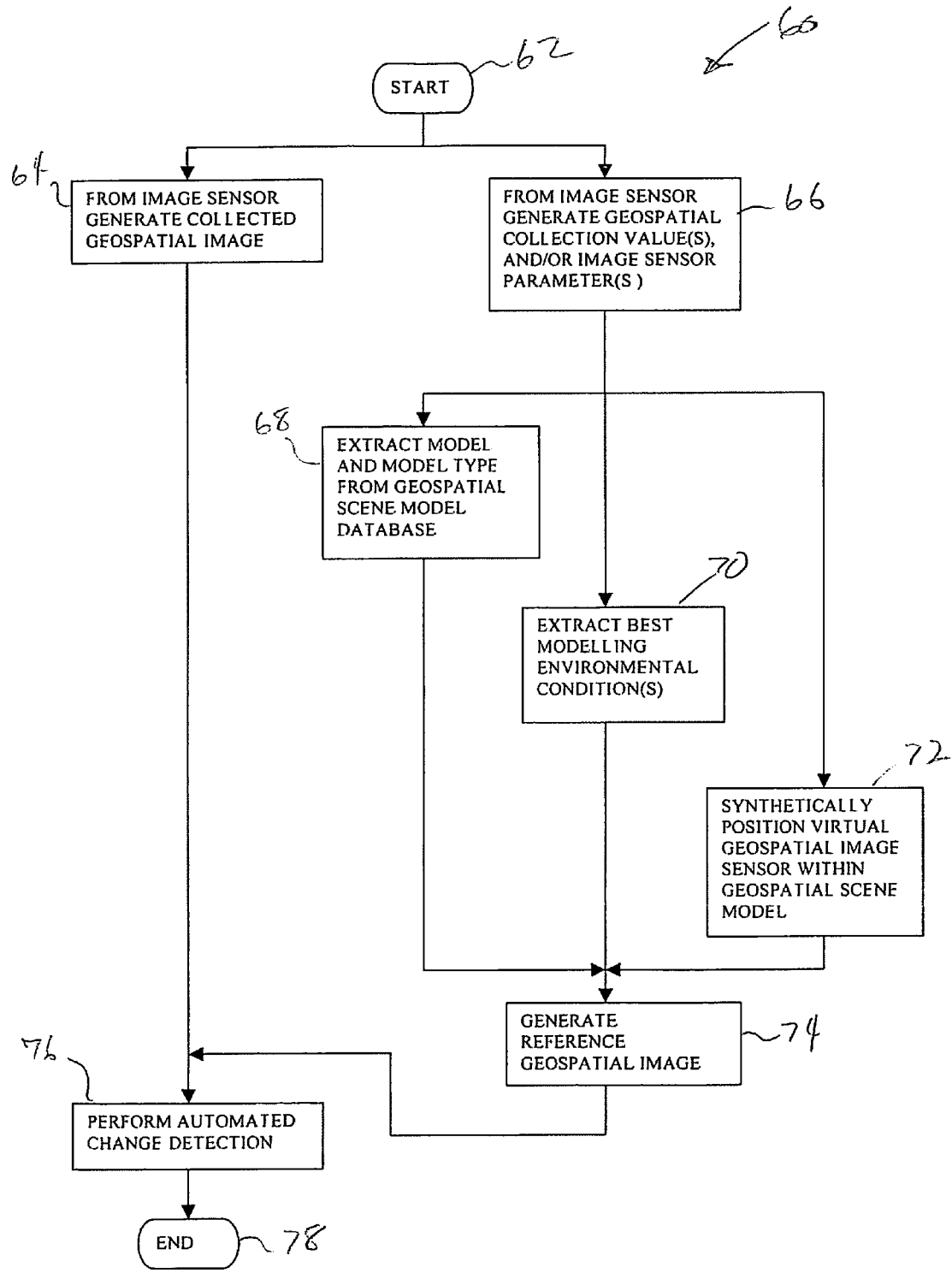
FIG. 3 is a flowchart for the method corresponding to the image change detecting system as shown in FIG. 2.

Referring now additionally to the flowchart 60 of FIG. 3, various method aspects relating to image change detection are now explained. From the start at Block 62 the image sensor may be used to generate the collected geospatial image (Block 64) and the geospatial collection values, and/or image sensor parameters (Block 66). Thereafter, at Block 68 the model and model type may be extracted from the geospatial scene model database with the result fed to Block 74 that generates the reference geospatial image. Optionally, at Block 70 the best environmental condition(s) may be determined or extracted and applied to generate the reference geospatial image at Block 74. At Block 72 the virtual geospatial image sensor is synthetically positioned with the geospatial scene model and its output also fed to Block 74 to generate the reference geospatial image. At Block 76 the collected geospatial image from Block 64 and the reference geospatial image from Block 74 are compared by any of the commonly available hardware/software to perform the change detection before stopping at Block 78.

Figure 4:
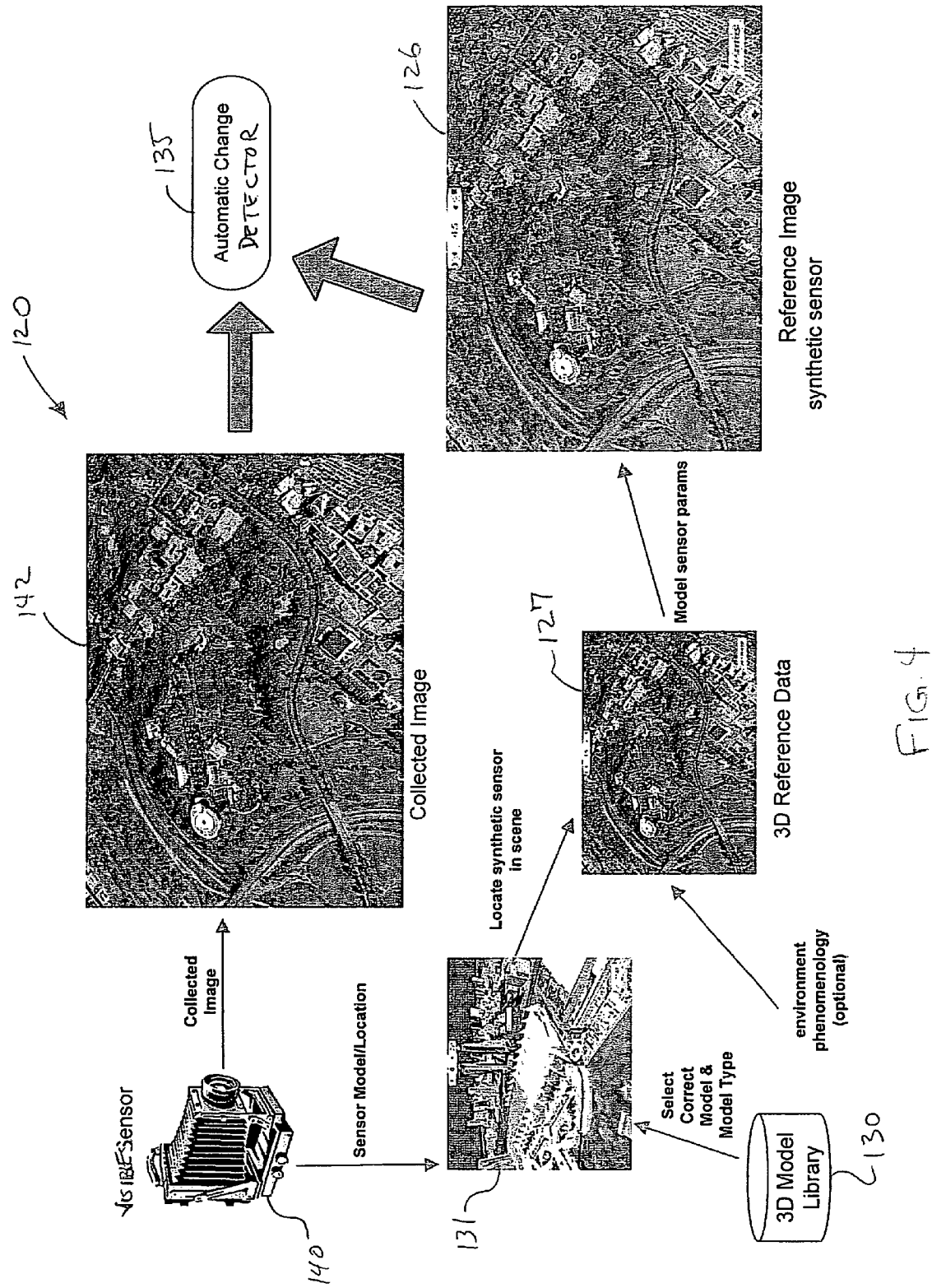
FIG. 4 is a schematic block diagram including representative images for a visible image sensor embodiment of the image change detecting system as shown in FIG. 2.
Figure 5:
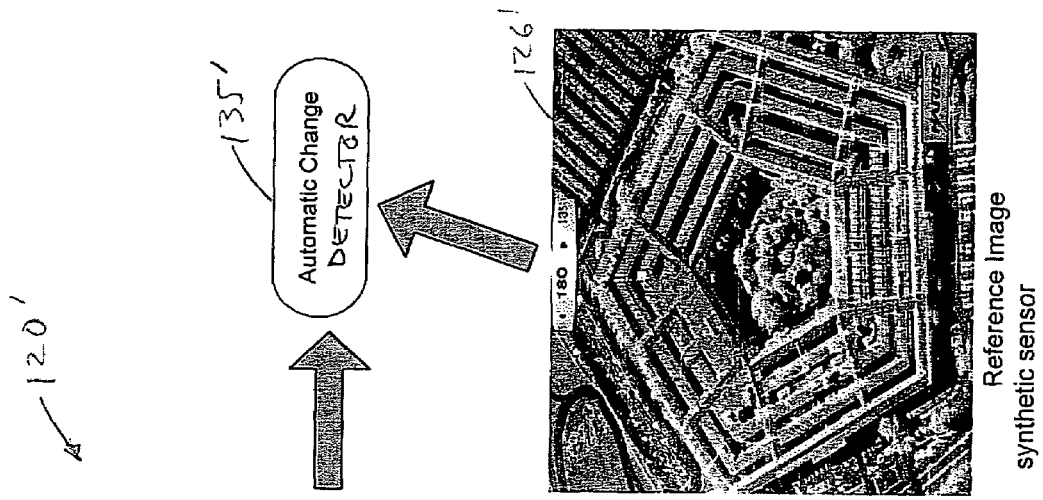
FIG. 5 is a schematic block diagram including representative images for a SAR image sensor embodiment of the image change detecting system as shown in FIG. 2.
Figure 5:
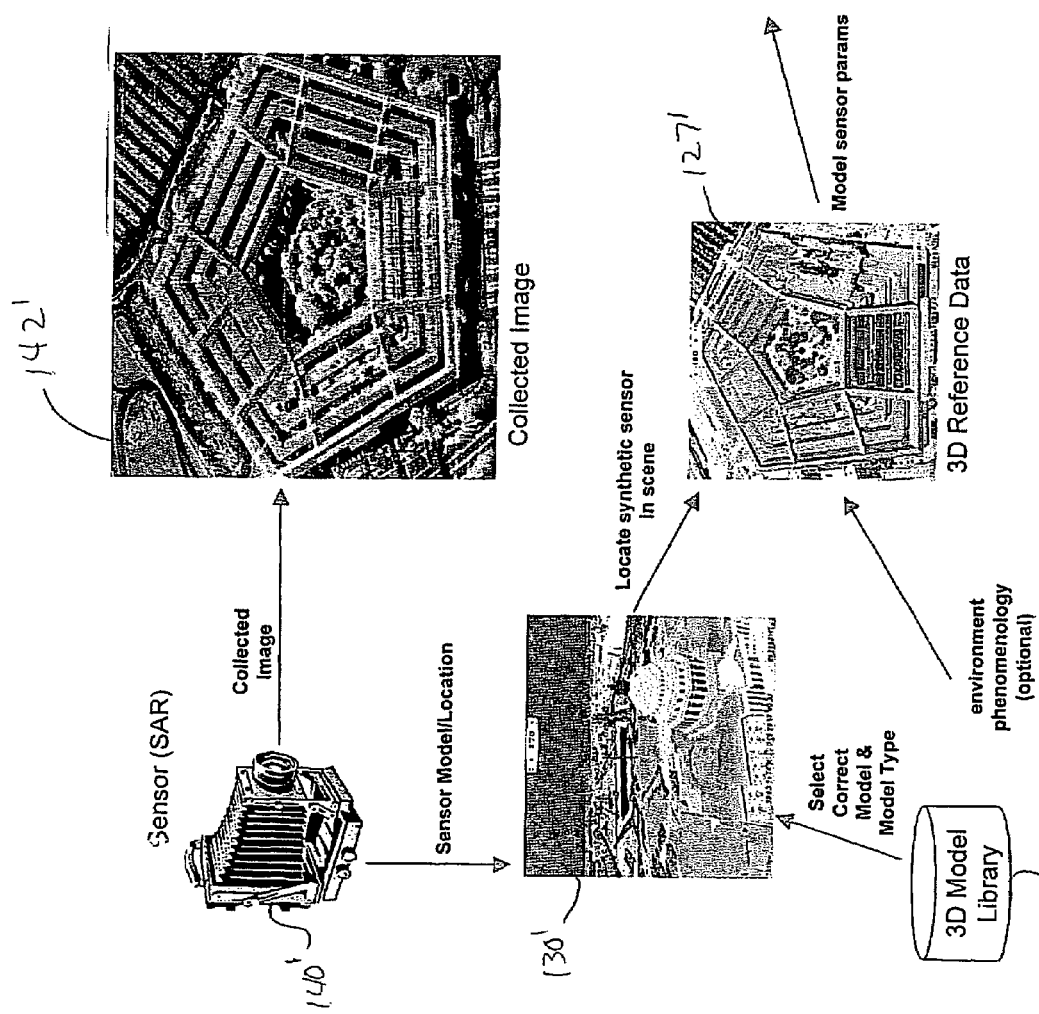
Figure 6:
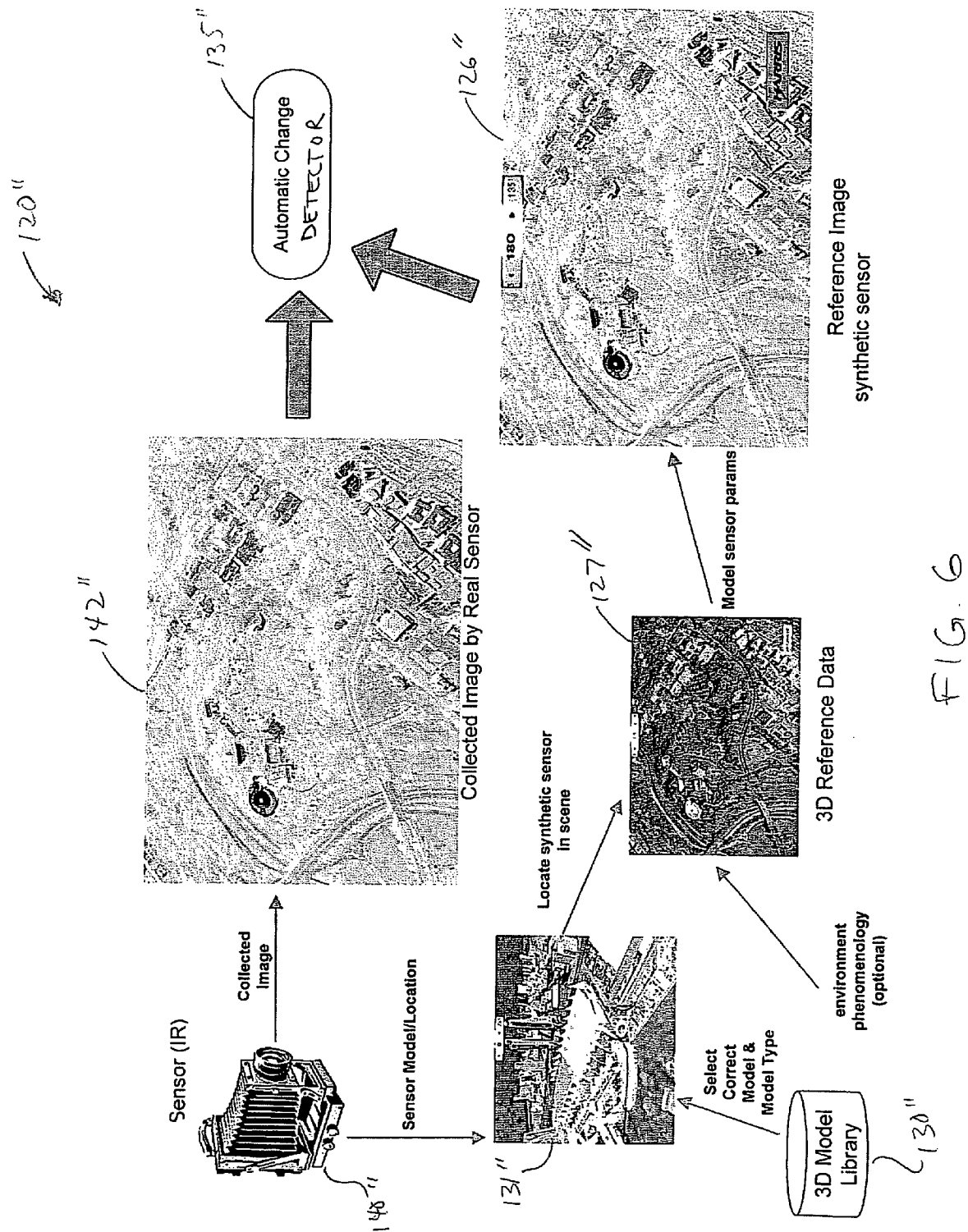
FIG. 6 is a schematic block diagram including representative images for an infrared image sensor embodiment of the image change detecting system as shown in FIG. 2.

Referring now additionally to FIGS. 4-6, representative examples of image change detection systems 120, 120' and 120" are now explained in greater detail. As seen in FIG. 4, the image change detecting system 120 includes a visible image sensor 140 pictorially and schematically illustrated as a camera that generates the collected geospatial image 142. The visible image sensor 140 also generates the sensor model/location information as described above which is used to select the correct model and model type represented by the model scene portion 131. The virtual sensor is synthetically positioned within the model scene producing the 3D reference image data 127. Thereafter the sensor parameters are considered to produce the reference geospatial image 126, and this reference geospatial image along with the collected geospatial image are processed by the automatic image change detector 135.

The image change detection system 120' in FIG. 5 is similar, however, the image sensor 140' is a SAR image sensor as will be appreciated by those skilled in the art. The remainder of the blocks and representative scenes and images are indicated with prime notation, are similar to those of the system 120 described above with reference to FIG. 4, and require no further discussion herein.

Similarly, the image change detection system 120' in FIG. 5 is similar, however, the image sensor 140' is an infrared (IR) image sensor as will be appreciated by those skilled in the art. The remainder of the blocks and representative scenes and images are indicated with prime notation, are similar to those of the system 120 described above with reference to FIG. 4, and require no further discussion herein.

Figure 7:
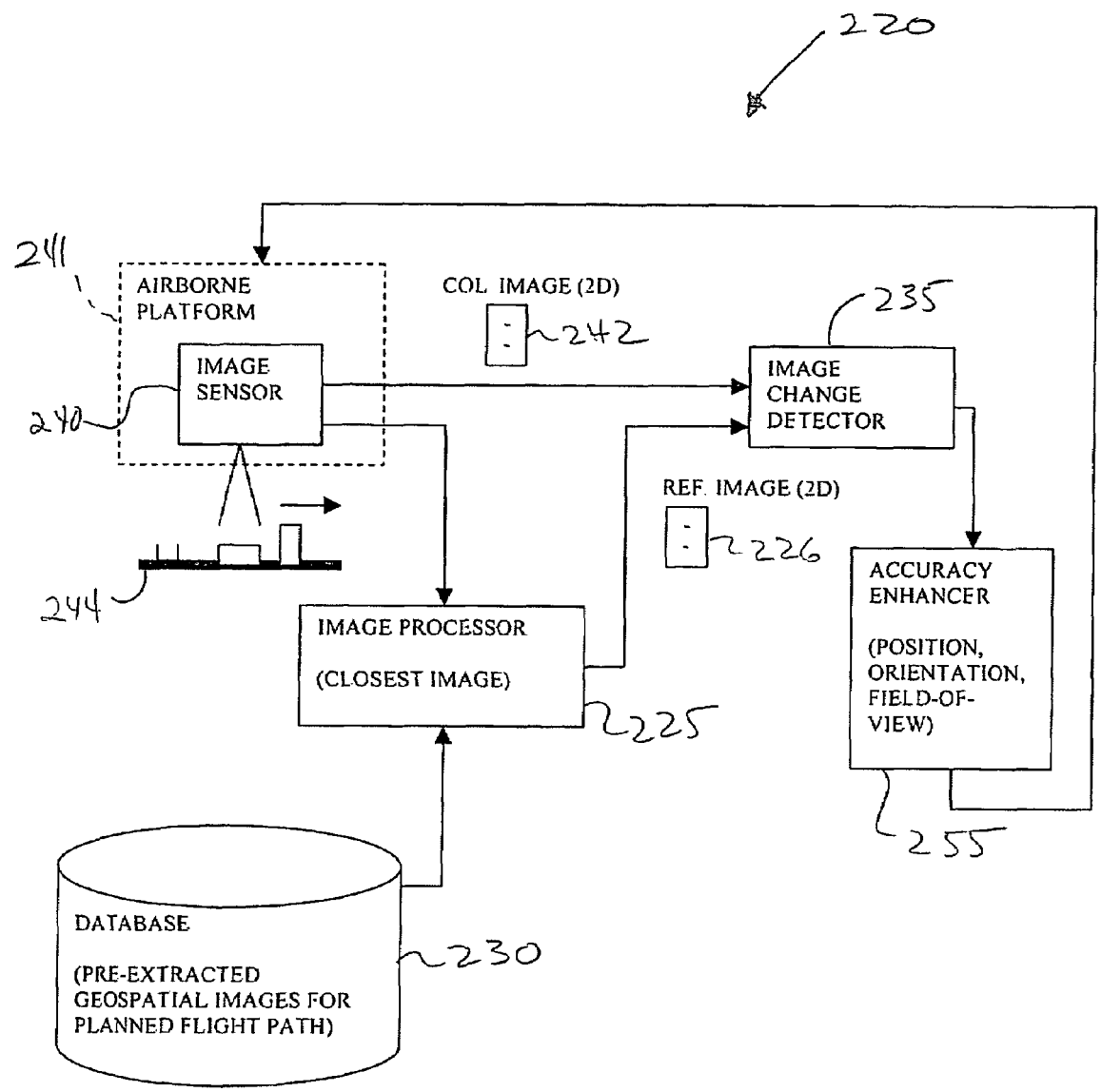
FIG. 7 is a schematic block diagram of an accuracy enhancing system including portions from the image change detecting system as shown in FIG. 1.

Referring now additionally to FIG. 7 an accuracy enhancing system 220 is now described incorporating and building upon the image change detection concepts described above. More particularly, the accuracy enhancing system 220 illustratively includes an image processor 225 cooperating with a database 230 for generating a reference geospatial image 226 corresponding to the collected geospatial image 242 from the image sensor 240 carried by the airborne platform 241. The system 220 also includes an image change detector 235 cooperating with the image processor 225 for detecting a change between the collected geospatial image 242 and the reference geospatial image 226. In addition, the system 230 also includes an accuracy enhancer 255 that may cooperate with the change detector 235 for generating at least one enhanced accuracy value corresponding to at least one geospatial collection value based upon the change detected between the collected geospatial image and the reference geospatial image.

The airborne platform 241 may traverse an actual flight path over the scene 244 based upon a planned flight path. Accordingly, the image processor 225 may generate the reference geospatial image 226 based upon correlation of the actual flight path with the planned flight path. For example, the image processor 225 may generate the closest reference image from the database 230 to the collected geospatial image 242 such as based upon receiving a GPS position from the airborne platform 241 as will be appreciated by those skilled in the art. In other words, an alignment disparity may be minimized to determine the closest reference geospatial image 226.

The at least one geospatial collection value may comprise a geospatial collection sensor position. This may be beneficial to correct a measured position of the airborne platform 241, such as based upon its inertial navigation and/or GPS equipment. The at least one geospatial collection value may alternatively or additionally comprise a geospatial collection sensor orientation or a geospatial collection sensor field-of-view. Enhancement of one or both of these values in addition to the position, for example, may enhance sensor data collection accuracy as will be appreciated by those skilled in the art.

As noted above, the database 230 may comprise a geospatial scene model database in some advantageous embodiments. The geospatial scene model database may comprise three-dimensional (3D) scene model data, and the collected geospatial image and the reference geospatial image may each comprise respective two-dimensional (2D) image data. The geospatial scene model database may comprise at least one of terrain data, building data, and foliage data, as noted above. More particularly, the collected geospatial image may have at least one geospatial collection value associated therewith. Accordingly, the image processor 225 may generate the reference geospatial image based upon synthetically positioning a virtual geospatial image sensor within a geospatial scene model based upon the at least one geospatial collection value as also described above. The at least one geospatial collection value may include at least one of a geospatial collection position, a geospatial collection orientation, and a geospatial collection field-of-view, for example.

Figure 8:
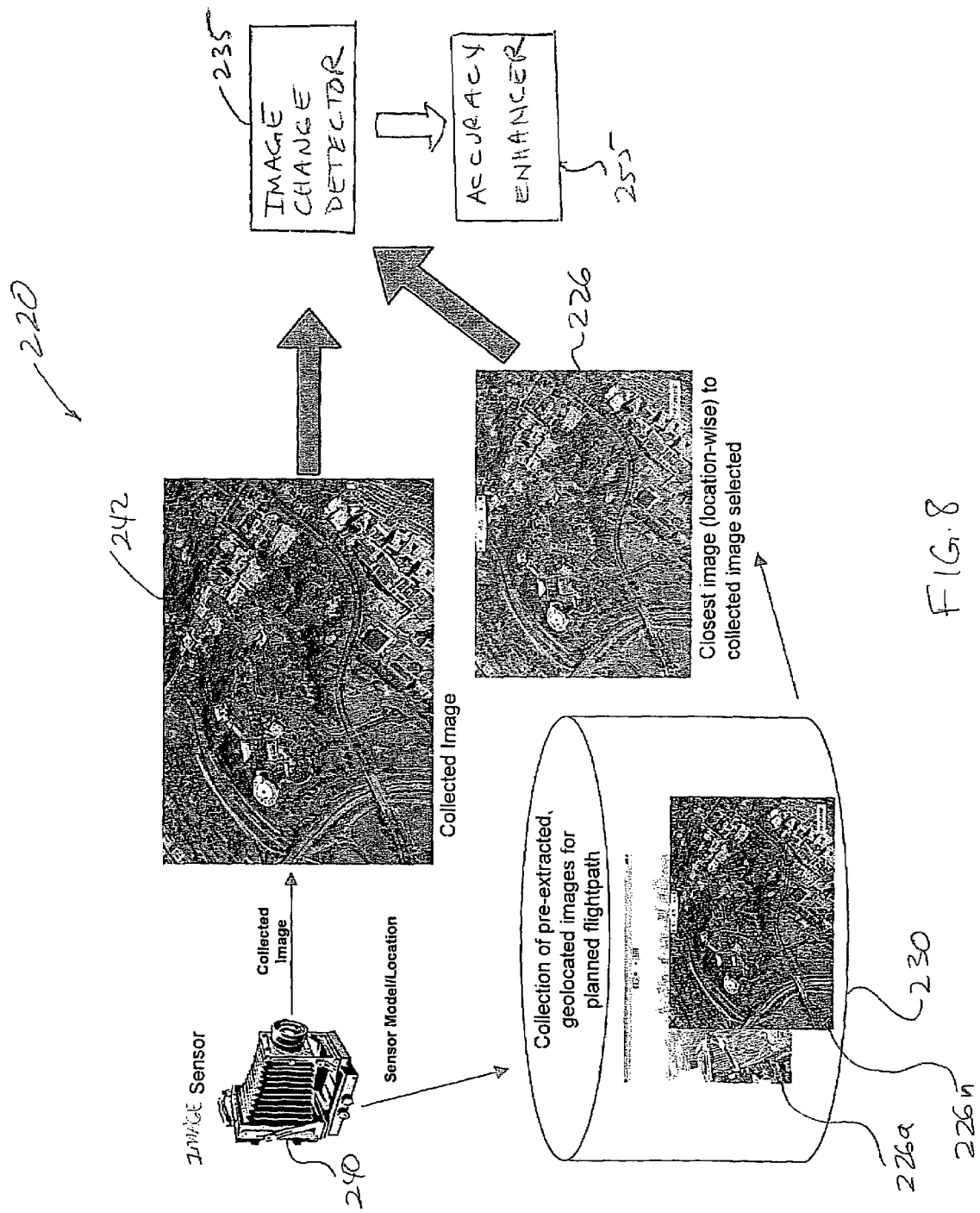
FIG. 8 is a schematic block diagram including representative images for a visible image sensor embodiment of the accuracy enhancing system as shown in FIG. 7.

The accuracy enhancing system is explained now in greater detail with exemplary images as shown in FIG. 8. The accuracy enhancing system 220 generates the collected image 242 from the image sensor 240. In addition, the closest image is selected as the reference geospatial image 226 (location or position wise) by the image processor 225 (FIG. 7). This reference geospatial image 226 is selected from a series of pre-extracted geospatial images 226*a*-226*n* within the database 230. The pre-extracted geospatial images 226*a*-226*n* may be from ground and/or airborne collection platforms as will be appreciated by those skilled in the art.

Figure 9:
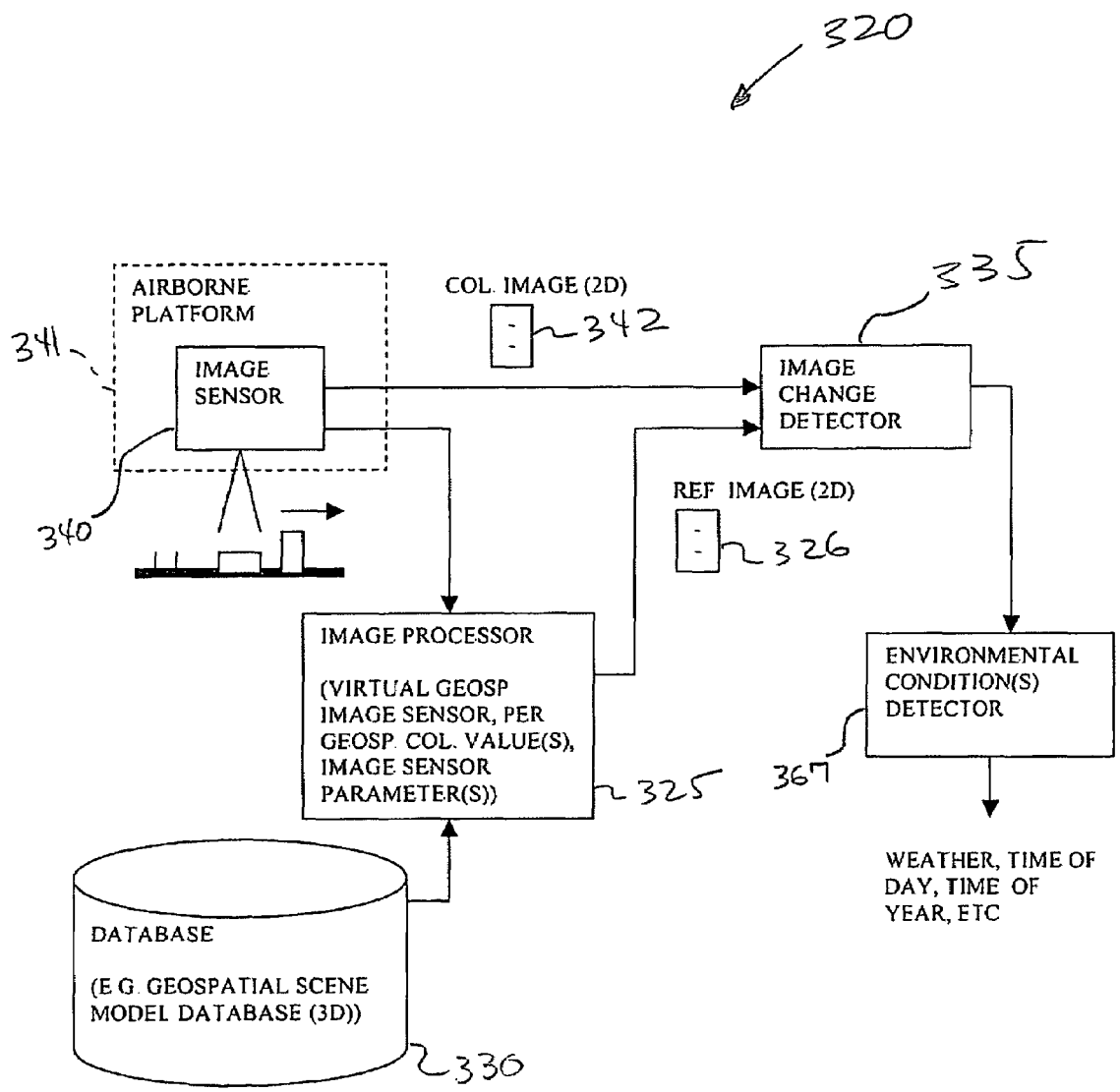
FIG. 9 is a schematic block diagram of an environmental condition determining system including portions from the image change detecting system as shown in FIG. 2.

Referring now additionally to FIG. 9, another advantageous environmental condition detecting system 320 is now described and operates based upon the principles and features described above. In particular, the environmental condition detection system 320 may be considered as operating conversely to the image change detecting systems 20', 120, 120' and 120" including an input for one or more environmental conditions, as described above with reference to FIGS. 2-6. In the illustrated environmental condition detecting system 320 the image sensor 340 aboard the airborne platform 341 generates the collected imaged 342, and the image processor 325 cooperates with the database 330 for generating a reference geospatial image 326 corresponding to the collected geospatial image. The change detector 335, in turn, cooperates with the image processor 325 for detecting a change between the collected geospatial image 342 and the reference geospatial image 326. Lastly, an environmental condition detector 367 may cooperate with the change detector 335 for detecting the at least one environmental condition associated with the collected geospatial image 342 based upon the change between the collected geospatial image and the reference geospatial image 326.

As will be appreciated by those skilled in the art, the at least one environmental condition may comprise at least one weather condition, such as, for example, at least one of image obscuration and surface reflectivity. The at least one environmental condition may additionally or alternatively comprise at least one of a time of day and a time of year.

The database 330 may comprise a geospatial scene model database. The geospatial scene model database may comprise three-dimensional (3D) scene model data, and the collected geospatial image 342 and the reference geospatial image 326 may each comprise respective two-dimensional (2D) image data. As noted above, the geospatial scene model database 330 may comprise at least one of terrain data, building data, and foliage data. Also, the collected geospatial image 342 may have at least one geospatial collection value associated therewith. Accordingly, the image processor 325 may generate the reference geospatial image 326 based upon synthetically positioning a virtual geospatial image sensor within a geospatial scene model based upon the at least one geospatial collection value. For example, the at least one geospatial collection value may comprise at least one of a geospatial collection position, a geospatial collection orientation, and a geospatial collection field-of-view.

Considered in slightly different terms, disclosed herein are automated systems and methods relating to performing change detection algorithms whereby a collected geospatial image is compared to a reference geospatial image extracted from a pre-existing 3D scene model through a synthetic camera which is created and placed in the scene in such a way as to match the collected image sensor's location and parameterization (e.g. field-of-view, hyperspectral vs. monochromatic, etc.). Further, relevant known "real-world" phenomenology such as atmospheric and time-of-day effects, overall ground lighting/reflectivity properties (e.g. ocean vs. dense forest) can be simulated in the scene before the reference geospatial image is used for change detection to thereby improve results. The disclosed systems and methods may permit total freedom in virtual sensor positioning for reference image extraction, total freedom in sensor parameterization (i.e. sensor modeling) including spectral components. Other aspects of the systems and method disclosed herein may be understood with reference to related copending applications entitled: "ACCURACY ENHANCING SYSTEM FOR GEOSPATIAL COLLECTION VALUE OF AN IMAGE SENSOR ABOARD AN AIRBORNE PLATFORM AND ASSOCIATED METHODS", having U.S. application Ser. No. 11/328,676, "GEOSPATIAL IMAGE CHANGE DETECTING SYSTEM AND ASSOCIATED METHODS", having U.S. application Ser. No. 11/328,669, now U.S. Pat. No. 7,528,938, and "ENVIRONMENTAL CONDITION DETECTING SYSTEM USING GEOSPATIAL IMAGES AND ASSOCIATED METHODS", having U.S. application Ser. No. 11/328,678, the entire disclosures of each of which are incorporated herein by reference.

The various databases, image processors, change detectors, and other components described herein may be implemented using programmable digital computing hardware and software as will be readily appreciated by those skilled in the art. Of course, dedicated circuit components may also be used in some embodiments. In addition, many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. An image change detecting system to detect a change in a collected geospatial image from a geospatial image sensor carried by an airborne platform, the image change detecting system comprising:
    a database;
    an image processor cooperating with said database for generating a reference geospatial image corresponding to the collected geospatial image;
    an image enhancer for enhancing at least one of the reference geospatial image and the collected geospatial image based upon at least one environmental condition; and
    a change detector cooperating with said image processor and said image enhancer for detecting a change between the collected geospatial image and the reference geospatial image with at least one thereof enhanced by said image enhancer based upon the at least one environmental condition.

2. An image change detecting system according to claim 1 wherein the at least one environmental condition comprises at least one weather condition.

3. An image change detecting system according to claim 2 wherein the at least one weather condition relates to at least one image obscuration and surface reflectivity.

4. An image change detecting system according to claim 1 wherein the at least one environmental condition comprises at least one of a time of day and a time of year.

5. An image change detecting system according to claim 1 wherein the at least one environmental condition is associated with the collected geospatial image.

6. An image change detecting system according to claim 1 wherein said database comprises a geospatial scene model database.

7. An image change detecting system according to claim 6 wherein said geospatial scene model database comprises three-dimensional (3D) scene model data; and wherein each of the collected geospatial image and the reference geospatial image comprises respective two-dimensional (2D) image data.

8. An image change detecting system according to claim 6 wherein said geospatial scene model database comprises at least one of terrain data, building data, and foliage data.

9. An image change detecting system according to claim 6 wherein the collected geospatial image has at least one geospatial collection value associated therewith; and wherein said image processor generates the reference geospatial image based upon synthetically positioning a virtual geospatial image sensor within a geospatial scene model based upon the at least one geospatial collection value.

10. An image change detecting system according to claim 9 wherein the at least one geospatial collection value comprises at least one of a geospatial collection position, a geospatial collection orientation, and a geospatial collection field-of-view.

11. An image change detecting system to detect a change in a collected geospatial image from a geospatial image sensor carried by an airborne platform, the collected geospatial image having at least one environmental condition associated therewith, the image change detecting system comprising:
    a geospatial scene model database:
    an image processor cooperating with said geospatial scene model database for generating a reference geospatial image corresponding to the collected geospatial image;
    an image enhancer for enhancing the reference geospatial image based upon at least one environmental condition associated with the collected geospatial image; and
    a change detector cooperating with said image processor and said image enhancer for detecting a change between the collected geospatial image and the enhanced reference geospatial image.

12. An image change detecting system according to claim 11 wherein the at least one environmental condition comprises at least one of a weather condition, a time of day, and a time of year.

13. An image change detecting system according to claim 11 wherein said geospatial scene model database comprises three-dimensional (3D) scene model data; and wherein each of the collected geospatial image and the reference geospatial image comprises respective two-dimensional (2D) image data.

14. An image change detecting system according to claim 11 wherein the collected geospatial image has at least one geospatial collection value associated therewith; and wherein said image processor generates the reference geospatial image based upon synthetically positioning a virtual geospatial image sensor within a geospatial scene model based upon the at least one geospatial collection value.

15. An image change detecting system according to claim 14 wherein the at least one geospatial collection value comprises at least one of a geospatial collection position, a geospatial collection orientation, and a geospatial collection field-of-view.

16. An image change detecting method to detect a change in a collected geospatial image from a geospatial image sensor carried by an airborne platform, the image change detecting method comprising:
    using an image processor cooperating with a database for generating a reference geospatial image corresponding to the collected geospatial image;
    enhancing at least one of the reference geospatial image and the collected geospatial image based upon at least one environmental condition; and
    detecting a change between the collected geospatial image and the reference geospatial image with at least one thereof enhanced based upon the at least one environmental condition.

17. An image change detecting method according to claim 16 wherein the at least one environmental condition comprises at least one of a weather condition, a time of day, and a time of year.

18. An image change detecting method according to claim 16 wherein the at least one environmental condition is associated with the collected geospatial image.

19. An image change detecting method according to claim 16 wherein the database comprises a geospatial scene model database including three-dimensional (3D) scene model data; and wherein each of the collected geospatial image and the reference geospatial image comprises respective two-dimensional (2D) image data.

20. An image change detecting method according to claim 19 wherein the geospatial scene model database comprises at least one of terrain data, building data, and foliage data.

21. An image change detecting method according to claim 19 wherein the collected geospatial image has at least one geospatial collection value associated therewith; and wherein generates the reference geospatial image is based upon synthetically positioning a virtual geospatial image sensor within a geospatial scene model based upon the at least one geospatial collection value.

22. An image change detecting method according to claim 21 wherein the at least one geospatial collection value comprises at least one of a geospatial collection position, a geospatial collection orientation, and a geospatial collection field-of-view.

* * * * *